US012659785B2

(12) United States Patent
Sayed Hassan et al.

(10) Patent No.:     US 12,659,785 B2
(45) Date of Patent:          Jun. 16, 2026

(54) MINIMIZING INTERFERENCE BETWEEN TERRESTRIAL NETWORK SIGNALS AND NON-TERRESTRIAL NETWORK SIGNALS

(71) Applicant: QUALCOMM Incorporated, San Diego, CA (US)

(72) Inventors: Mohamad Sayed Hassan, Paris (FR); Ebraam Adel Khalifa, Ottensoos (DE); Marco Papaleo, Bologna (IT)

(73) Assignee: Qualcomm Incorporated, San Diego, CA (US)

( * ) Notice: Subject to any disclaimer, the term of this patent is extended or adjusted under 35 U.S.C. 154(b) by 377 days.

(21) Appl. No.: 18/446,376

(22) Filed: Aug. 8, 2023

(65) Prior Publication Data

US 2025/0056299 A1     Feb. 13, 2025

(51) Int. Cl.
*H04W 28/02*          (2009.01)
*H04W 52/36*          (2009.01)
*H04W 84/06*          (2009.01)

(52) U.S. Cl.
CPC ... *H04W 28/0236* (2013.01); *H04W 28/0278* (2013.01); *H04W 52/365* (2013.01); *H04W 84/06* (2013.01)

(58) Field of Classification Search
CPC ......... H04W 28/0236; H04W 28/0278; H04W 52/365; H04W 84/06; H04W 52/243
See application file for complete search history.

(56) References Cited

U.S. PATENT DOCUMENTS

| | | | | |
|---|---|---|---|---|
| 9,287,911 B1 * | 3/2016 | Chindapol | ............. | H04B 1/406 |
| 11,652,538 B2 * | 5/2023 | Vivanco | ................ | H04W 72/04 |
| | | | | 455/11.1 |
| 2014/0328309 A1 * | 11/2014 | Comstock | ........... | H04W 72/541 |
| | | | | 370/329 |
| 2020/0033849 A1 | 1/2020 | Yiu et al. | | |
| 2020/0178267 A1 * | 6/2020 | Caretti | ................. | H04W 8/005 |
| 2020/0314863 A1 * | 10/2020 | Wang | ................... | H04B 17/345 |
| 2021/0211169 A1 * | 7/2021 | Xue | ...................... | H04W 16/28 |
| 2024/0022913 A1 * | 1/2024 | Medles | ............. | H04B 7/18513 |
| 2024/0049273 A1 * | 2/2024 | Lee | .................... | H04B 7/18539 |
| 2024/0259983 A1 * | 8/2024 | Alasti | ................... | H04W 64/00 |

FOREIGN PATENT DOCUMENTS

| | | | | | |
|---|---|---|---|---|---|
| EP | | 3787348 A1 * | 3/2021 | ............ | H04W 48/12 |
| WO | WO-2023208513 A1 * | | 11/2023 | ............ | H04W 16/14 |

* cited by examiner

*Primary Examiner* — Afshawn M Towfighi
(74) *Attorney, Agent, or Firm* — Patterson & Sheridan, LLP

(57)          ABSTRACT

Certain aspects of the present disclosure provide a method for wireless communications at a network entity, generally including receiving information regarding one or more user equipments (UEs) served by one or more terrestrial network (TN) cells, wherein the one or more TN cells operate in a first frequency band that at least partially overlaps with a second frequency band of a non-terrestrial network (NTN); and performing one or more actions, based on the information, to mitigate expected uplink (UL) interference to the NTN caused by the UEs.

17 Claims, 13 Drawing Sheets

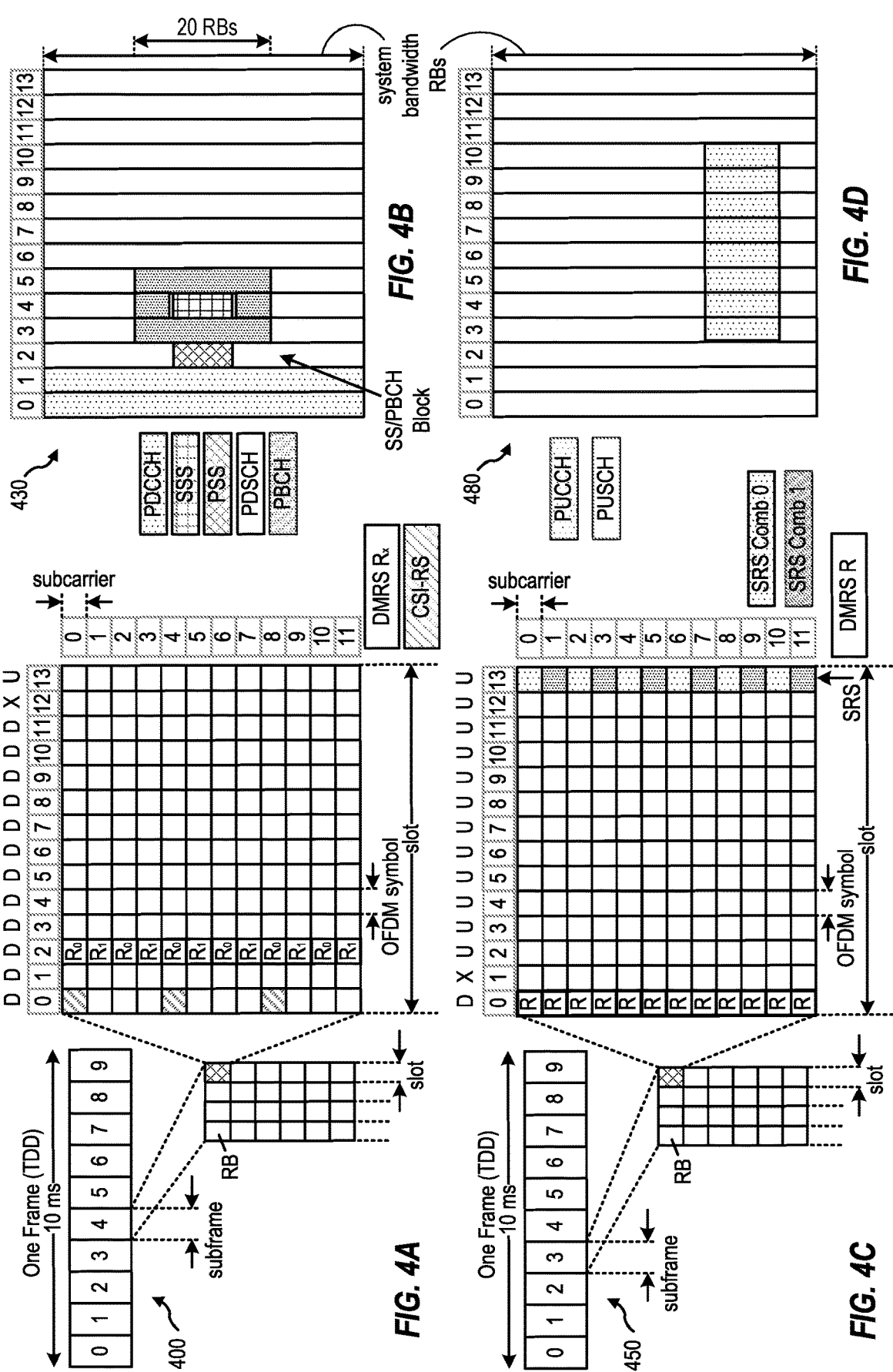

$$i_1 = 10^{\left(\frac{RSRP_1 - EIRP_{max}^{SAT}}{P_{max}^{UE} + AG_{UE_1}}\right)}$$

$$i_2 = 10^{\left(\frac{RSRP_2 - EIRP_{max}^{SAT}}{P_{max}^{UE} + AG_{UE_2}}\right)}$$

$$i_3 = 10^{\left(\frac{RSRP_3 - EIRP_{max}^{SAT}}{P_{max}^{UE} + AG_{UE_3}}\right)}$$

Sub-Beam #1

Sub-Beam #2

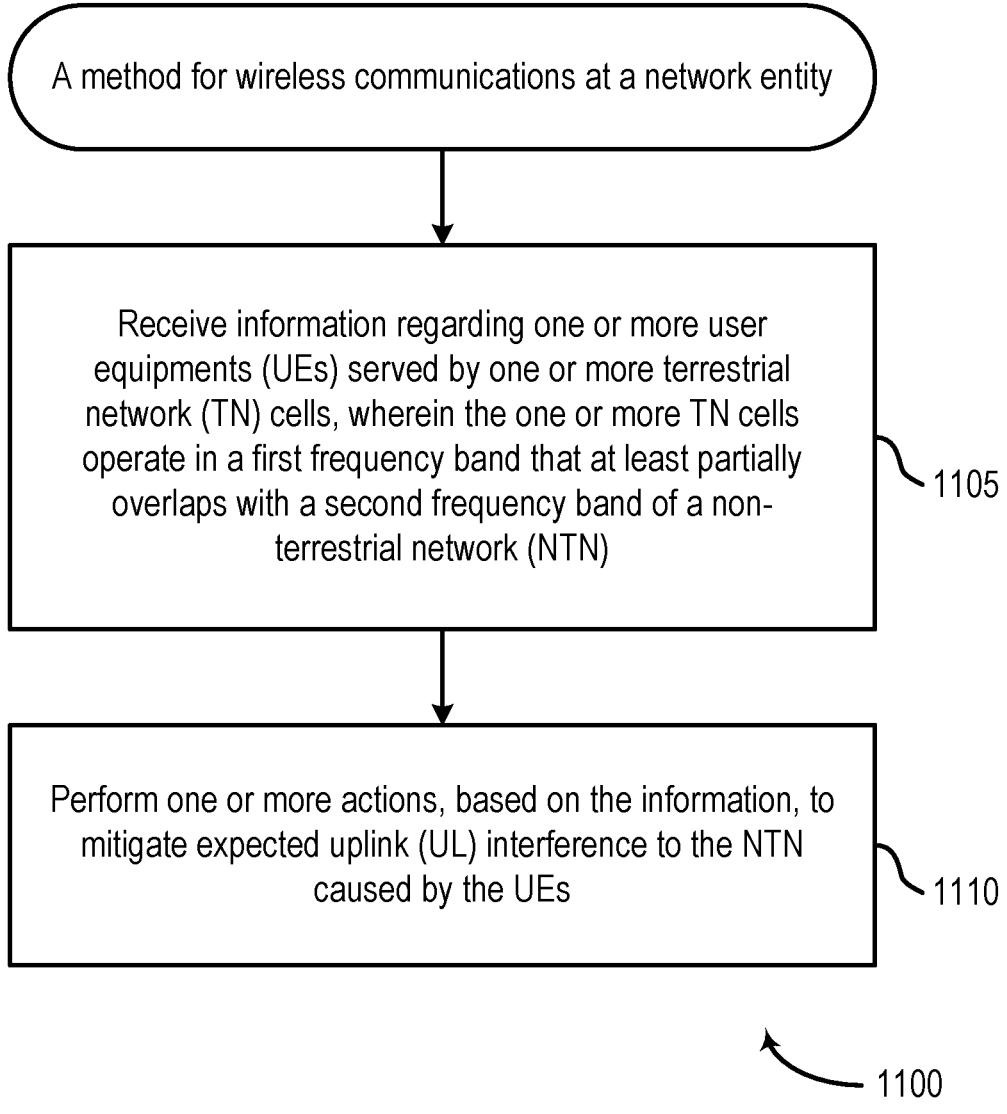

A method for wireless communications at a network entity

Receive information regarding one or more user equipments (UEs) served by one or more terrestrial network (TN) cells, wherein the one or more TN cells operate in a first frequency band that at least partially overlaps with a second frequency band of a non-terrestrial network (NTN) — 1105

Perform one or more actions, based on the information, to mitigate expected uplink (UL) interference to the NTN caused by the UEs — 1110

MINIMIZING INTERFERENCE BETWEEN TERRESTRIAL NETWORK SIGNALS AND NON-TERRESTRIAL NETWORK SIGNALS

BACKGROUND

Field of the Disclosure

Aspects of the present disclosure relate to wireless communications, and more particularly, to techniques for minimizing interference from data signals transmitted to a terrestrial network coexisting with a non-terrestrial network.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Non-terrestrial networks can operate on an overlapping frequency band as a terrestrial network, to increase the capability of a wireless communication network. However, using an overlapping frequency band can result in increased interference to the non-terrestrial network receiver. As such, there is a desire to reduce interference to the non-terrestrial network receiver, when the network operates in band with a terrestrial network, enhancing capability of wireless communications, while also improving reliability and cost-effectiveness.

SUMMARY

One aspect provides a method for wireless communications at a network entity. The method includes receiving information regarding one or more user equipments (UEs) served by one or more terrestrial network (TN) cells, wherein the one or more TN cells operate in a first frequency band that at least partially overlaps with a second frequency band of a non-terrestrial network (NTN); and performing one or more actions, based on the information, to mitigate expected uplink (UL) interference to the NTN caused by the UEs.

Another aspect provides a method for wireless communication by a user equipment (UE), the method. The method includes receiving, from a network entity of a terrestrial network (TN), an indication that the UE is to perform at least one action to mitigate expected uplink (UL) interference with a non-terrestrial network (NTN); and performing the at least one action.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIG. 11 depicts a method for wireless communications by a network entity.

DETAILED DESCRIPTION

Aspects of the present disclosure provide apparatuses, methods, processing systems, and computer-readable mediums for mitigating interference from certain UEs that are operating in a serving cell of an in band TN and NTN wireless communication network.

NTNs, such as satellite-based NTNs, may play a crucial role in providing connectivity with global coverage including rural and offshore areas, which are fundamental for supporting important use cases. An NTN generally refers to a network, or segment of networks, using radio frequency (RF) resources on board a satellite. An NTN can also refer to a system where full (RF plus distributed unit (DU) and central unit (CU)) or partial gNB radio access network (RAN) functionality may be located at the satellite. In contrast, a TN generally refers to a network that relies on terrestrial (land) based infrastructure (e.g., a network of base stations on the ground).

In some scenarios, a UE may be within overlapping coverage areas of TN and NTN cells. In such cases, a TN cell may operate in a frequency band that partially or fully overlaps with a frequency band of an NTN cell. In this type of configuration, the TN and NTN share spectrum. Spectrum sharing is advantageous because it allows for increased wireless communication capability across the spectrum and may avoid the need for an NTN (operator) to purchase an additional spectrum.

However, when transmitting on a TN uplink channel, there can be interference with the NTN uplink receiver. This problem may be exacerbated when multiple UEs are transmitting on the same spectrum at the same time. That is, the uplink transmissions can be received by both the TN and NTN receivers, even if they are only meant to be received by the TN cell receiver(s), since the receivers operate on the same frequency band. This interference may result in degraded performance at the NTN receiver.

Aspects of the present disclosure provide techniques that may help reduce or mitigate interference from uplink transmissions in a TN cell (or cells) to an NTN uplink receiver. As a result, aspects of the present disclosure may help avoid interference at the NTN receiver, which may help improve overall NTN performance.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
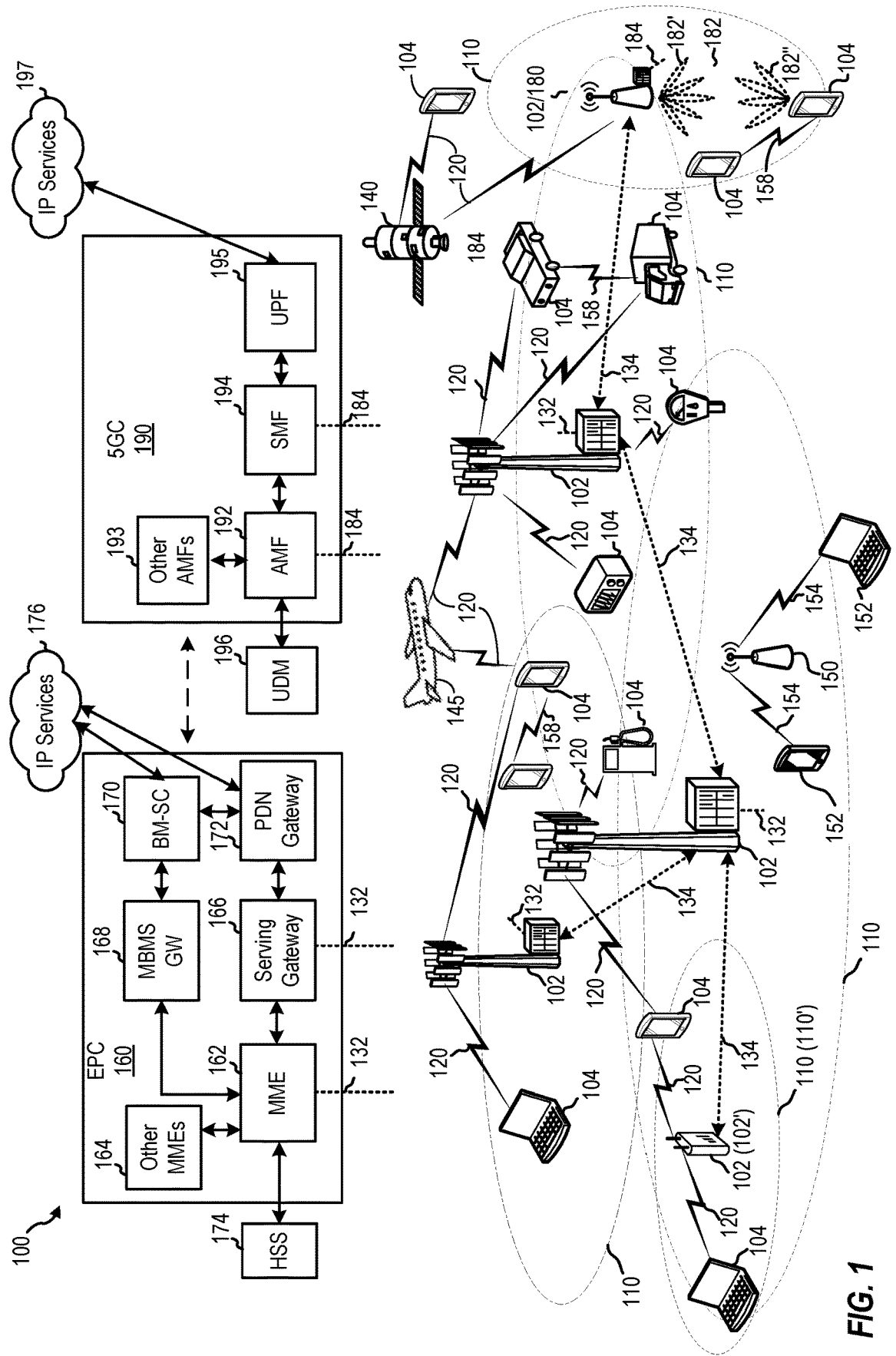
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipment.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
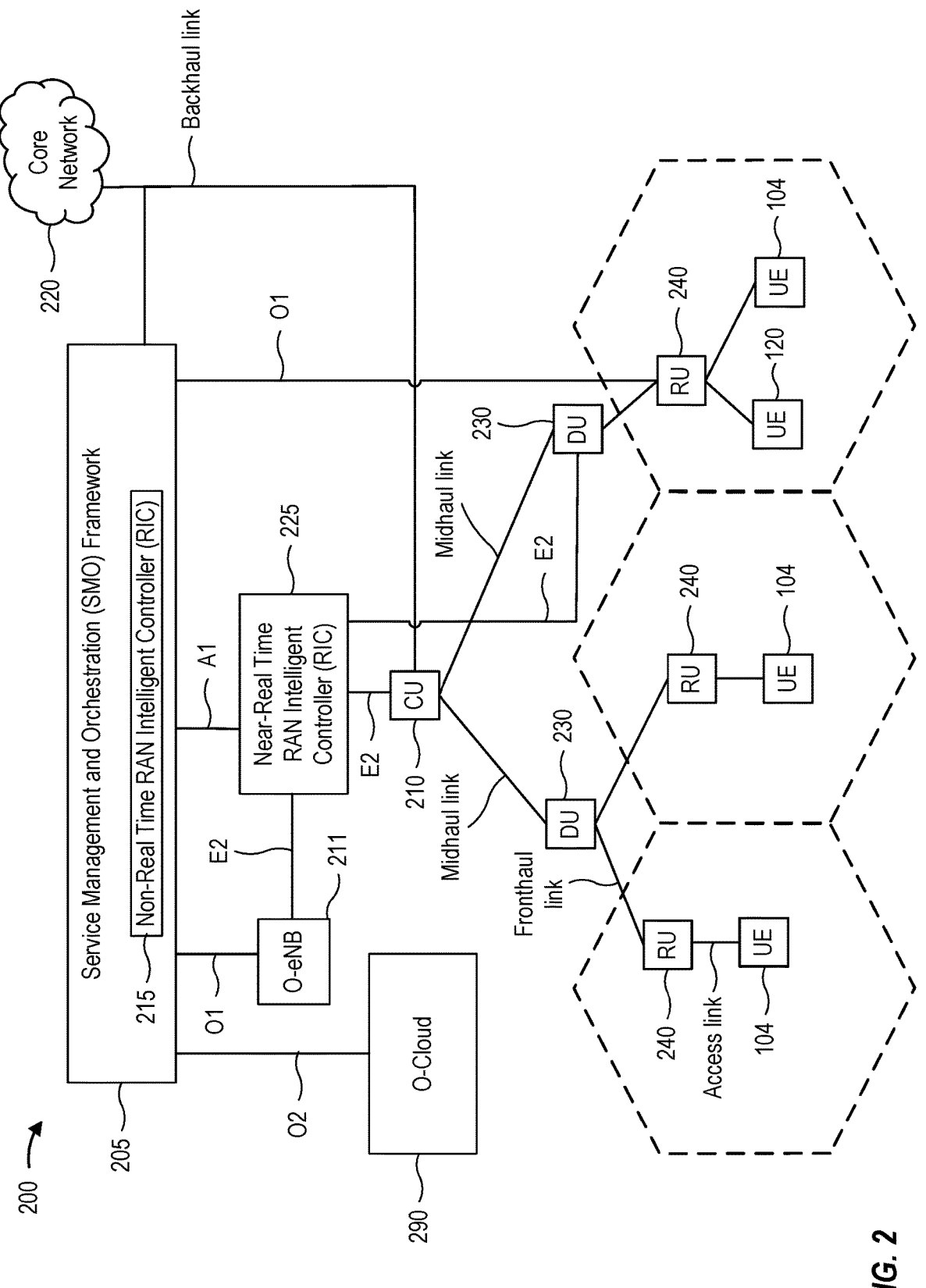
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bi-directionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
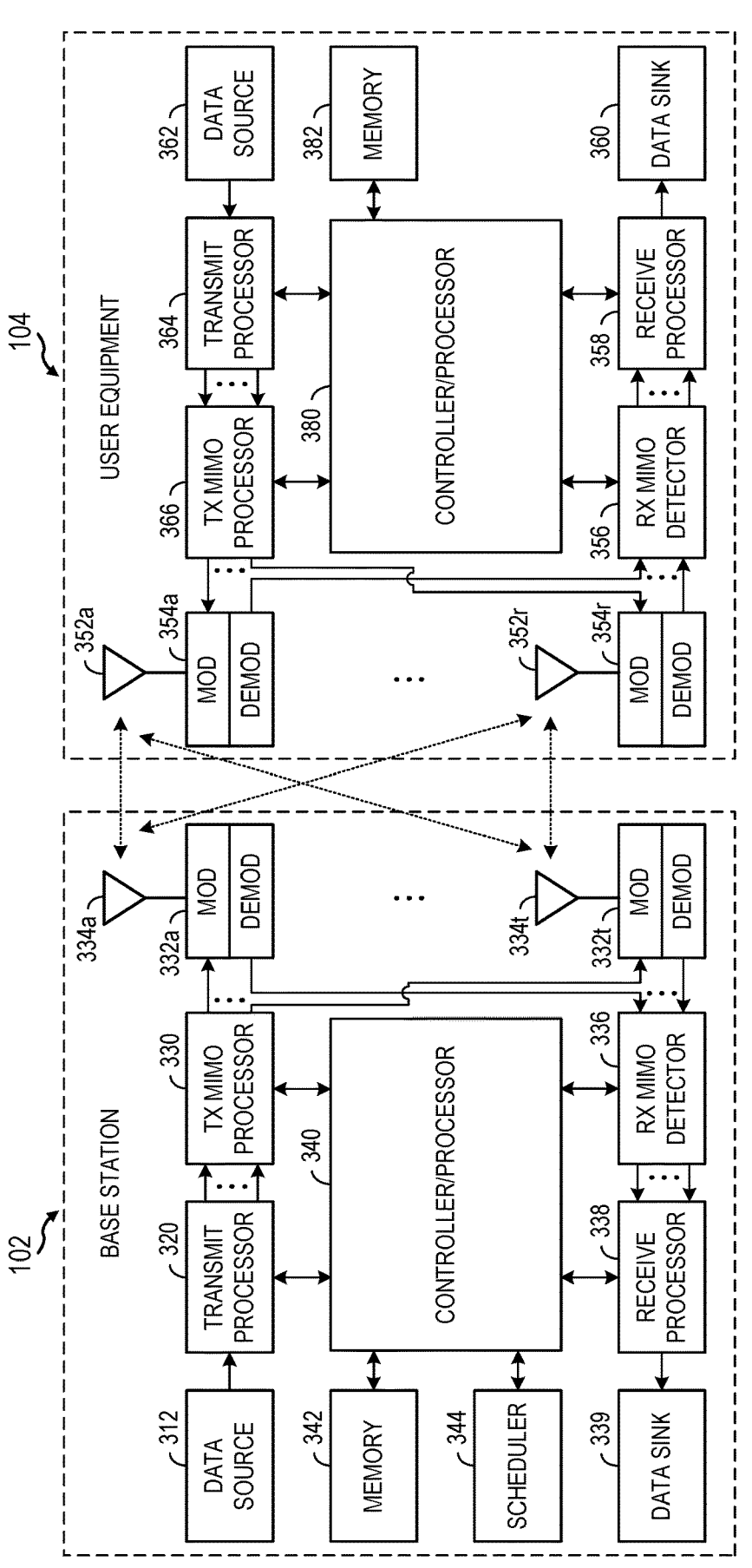
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Non-Terrestrial Networks

Satellite-based NTNs may play a crucial role in providing connectivity with global coverage including rural and off-shore areas, which are fundamental for supporting important use cases. A NTN generally refers to a network, or segment of networks, using RF resources on board a satellite. NTN signaling may be regenerative (with on-board NTN processing) or transparent (e.g., where the satellite sends back to Earth what it receives with only amplification and a shift from uplink to downlink frequency).

Figures 5A, 5B:
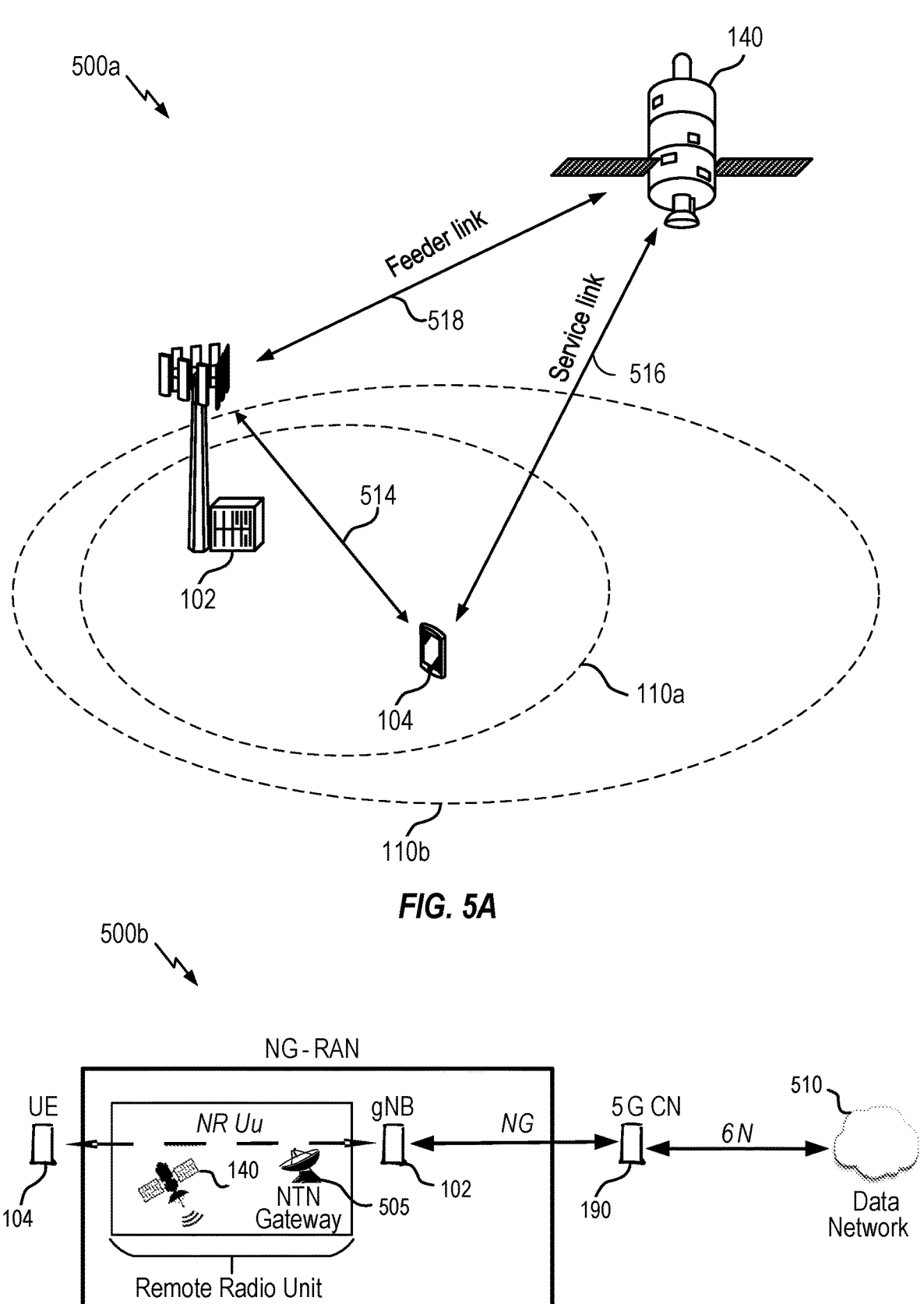
FIG. 5A depicts an example NTN.
FIG. 5B depicts an example NTN architecture.

FIG. 5A illustrates an example of a wireless communications network 500a including an NTN entity 140. In some examples, the wireless communications network 500a may implement aspects of the wireless communication network 100. For example, the wireless communications network 500a may include a ground station such as BS 102, a UE 104, and an NTN entity such as the satellite 140. BS 102 may serve a coverage area or cell 110a in cases of a terrestrial network, and NTN entity 140 may serve the coverage area 110b in cases of a non-terrestrial network. Some NTNs may employ airborne platforms (e.g., a drone or balloon) and/or space borne platforms (e.g., a satellite).

The NTN entity 140 may communicate with the BS 102 and UE 104 as part of wireless communications in an NTN. In cases of a terrestrial network, the UE 104 may communicate with the BS 102 over a communication link 514. In the case of NTN wireless communications, the NTN entity 140 may be a serving cell for the UE 104 via a communication link 516 referred to as a service link. In certain aspects, the NTN entity 140 may act as a relay (or a remote radio head) for the BS 102 and the UE 104. For example, the BS 102 may communicate with the NTN entity 140 via a communication link 518, and the NTN entity 140 may relay signaling between the BS 102 and UE 104 via the communication links 516, 518. The NTN entity 140 may communicate with a terrestrial gateway (e.g., a satellite dish) via a feeder link. The BS 102 may be co-located with a gateway, deployed behind the gateway, and/or deployed on the satellite 140.

An NTN beam may cover an area of 100 km to 1000 km for a LEO satellite and 200 km to 3500 km for a Geostationary orbit (GEO) satellite. As illustrated in FIG. 5B, an NG-RAN 500b deployment may include satellite 140 and NTN gateway (GW) 505 serving as the cellular Uu) link between a UE 104 and a terrestrial network (TN) gNB 102 (and the 5G core network 190). NG-RAN 500b generally represents radio access network for 5G and provides both NR and LTE radio access. The link between the UE 104 and satellite 140 is generally referred to as the service link, while the link between the satellite and GW is generally referred to as the feeder link.

In some aspects, the satellite 140 communicates with different UEs as it moves across its orbit. As the satellite orbits, it communicates with different UEs through different beams. Uplink signals from the UEs experience a round trip delay (RTD) that is generally a sum of the delay on the service link plus the delay on the feeder link. The maximum RTD is typically around 541.46 ms for GEO satellites, 25.77 ms for LEO satellites at 600 km altitude, and 41.77 ms for LEO satellites at 1200 km altitude. UE speed can typically be ignored in comparison with speed of LEO satellite.

When a satellite 140 moves and the UE 104 is outside of the coverage area 110b of the satellite 140 is referred to as discontinuous coverage. Further, when a satellite 140 may not have a feeder link connectivity to a ground station is referred to as intermittent coverage.

Aspects Related to NTN Interference Mitigation

Figure 6:
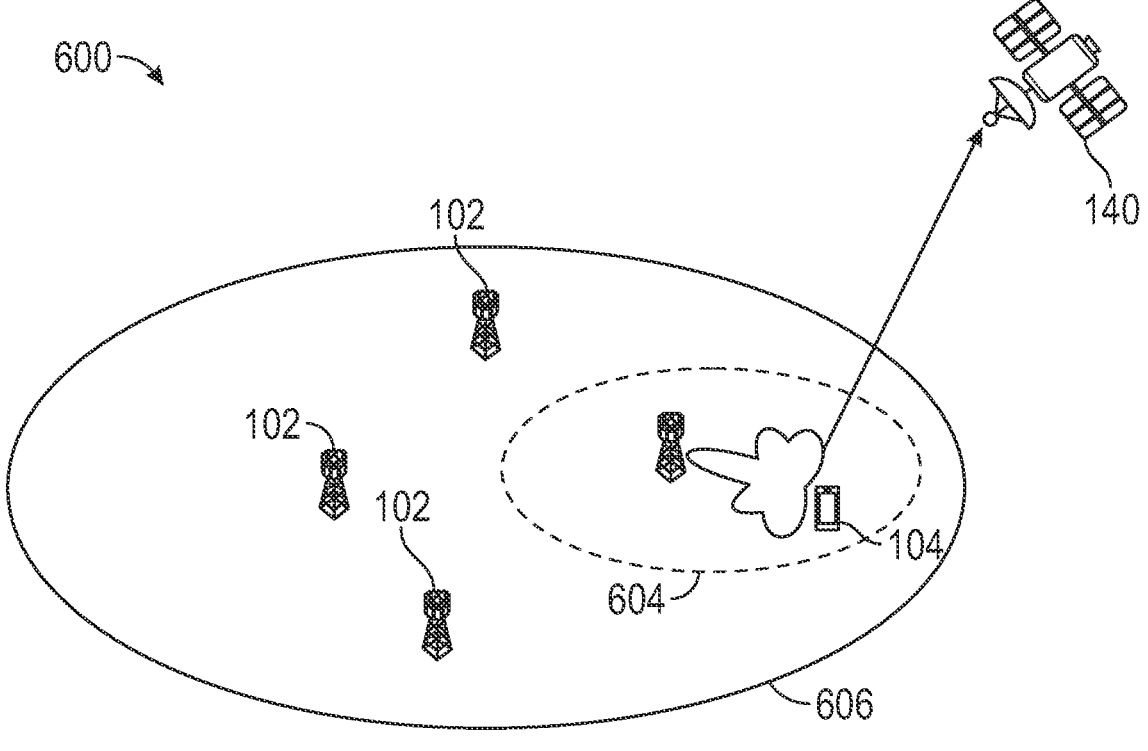
FIG. 6 depicts an example wireless communication network including TN and NTN components.

Aspects of the disclosure are related to terrestrial networks (TNs) and non-terrestrial networks (NTNs) with overlapping cells that serve one or more UEs. That is, a UE may be within the coverage area of both a TN cell and an NTN cell. FIG. 6 depicts an example wireless communication network 600, where a UE 102 is served by both a TN cell 604, and an NTN entity 140 (e.g., a satellite).

While only one TN cell 604 is specifically depicted in the exemplary figure as being within the NTN cell 606, there may be multiple TN cells in an NTN cell, as discussed above. Further, while one base station 102 (e.g., a gNB) is depicted in the TN cell 604 in the exemplary figure, there can be multiple base stations 102 in a TN cell in various deployments.

In wireless communication network 600 of FIG. 6, TN cell 604 operates in a frequency band that partially or fully overlaps with a frequency band of NTN cell 606, to serve UEs. In this type of configuration, the TN and NTN share a spectrum. As noted above, spectrum sharing may be advantageous because it allows for increased wireless communication capability across the spectrum and may help avoid the need for an NTN operator to purchase additional spectrum for operation.

As noted above, when transmitting on a TN uplink channel, there can be interference with the NTN uplink receiver. This problem may be exacerbated when multiple UEs are transmitting on the same spectrum at the same time. That is, the uplink transmissions can be received by both the TN and NTN receivers, even if they are only meant to be received by the TN cell receiver(s), since the receivers operate on the same frequency band. This interference may result in degraded performance at the NTN receiver.

Aspects of the present disclosure provide techniques that may help reduce or mitigate interference from uplink transmissions in a TN cell (or cells) to an NTN uplink receiver. As a result, aspects of the present disclosure may help avoid interference at the NTN receiver, which may help improve overall NTN performance.

The techniques described herein may be applied regardless of the actual operating frequencies. For example, in some systems, TN and NTN cells may coexist operating in frequency bands between 17 GHz and 27 GHz. The techniques described herein may be applied to TN and NTN coexistence on a shared spectrum that involve C-band (e.g., 3.7-3.98 GHz), Q-band (e.g., 37.5-42.5 GHz), and/or V-band (e.g., 47.2-52.4 GHz) configurations.

Aspects of the disclosure may involve the evaluation of an interference level at an NTN uplink receiver, from a group of UEs transmitting on a TN uplink channel (or channels). The interference level from a TN uplink to an NTN uplink receiver is an interference scenario evaluated in RAN4 for S-band deployments. In an exemplary deployment where a UE is transmitting on an uplink channel to a LEO uplink receiver at an 11.7 GHz frequency, an interference power level, measured in dBm/100 MHz, can be determined at different elevations of the LEO uplink receiver. In some examples, the elevation level of the LEO uplink receiver can range from 40 to 90 degrees. Further, as part of an interference evaluation, a satellite noise floor can be determined. In one example, an interference power level determination can assume a 6 dB margin to account for SAT thermal noise, assuming 100 MHz and 4.3 NF. This 6 dB margin can be subtracted from the interference power. In various deployments, up to 20% active traffic in the NTN beam footprint can be present for the LEO uplink receiver at 11.7 GHz.

Aspects of the present disclosure provide for the control of uplink transmission from a UE to minimize impact of uplink transmissions in TN cells on an NTN receiver. Within the coverage area of one NTN beam, there may be multiple base stations and gNB present, along with multiple UEs. While uplink transmissions from one UE alone may not have a big impact on an NTN receiver, multiple UEs in aggregate can have a significant impact. As such, it may be advantageous to determine a cumulative effect of (aggregated) received power on an NTN receiver.

Figure 7:
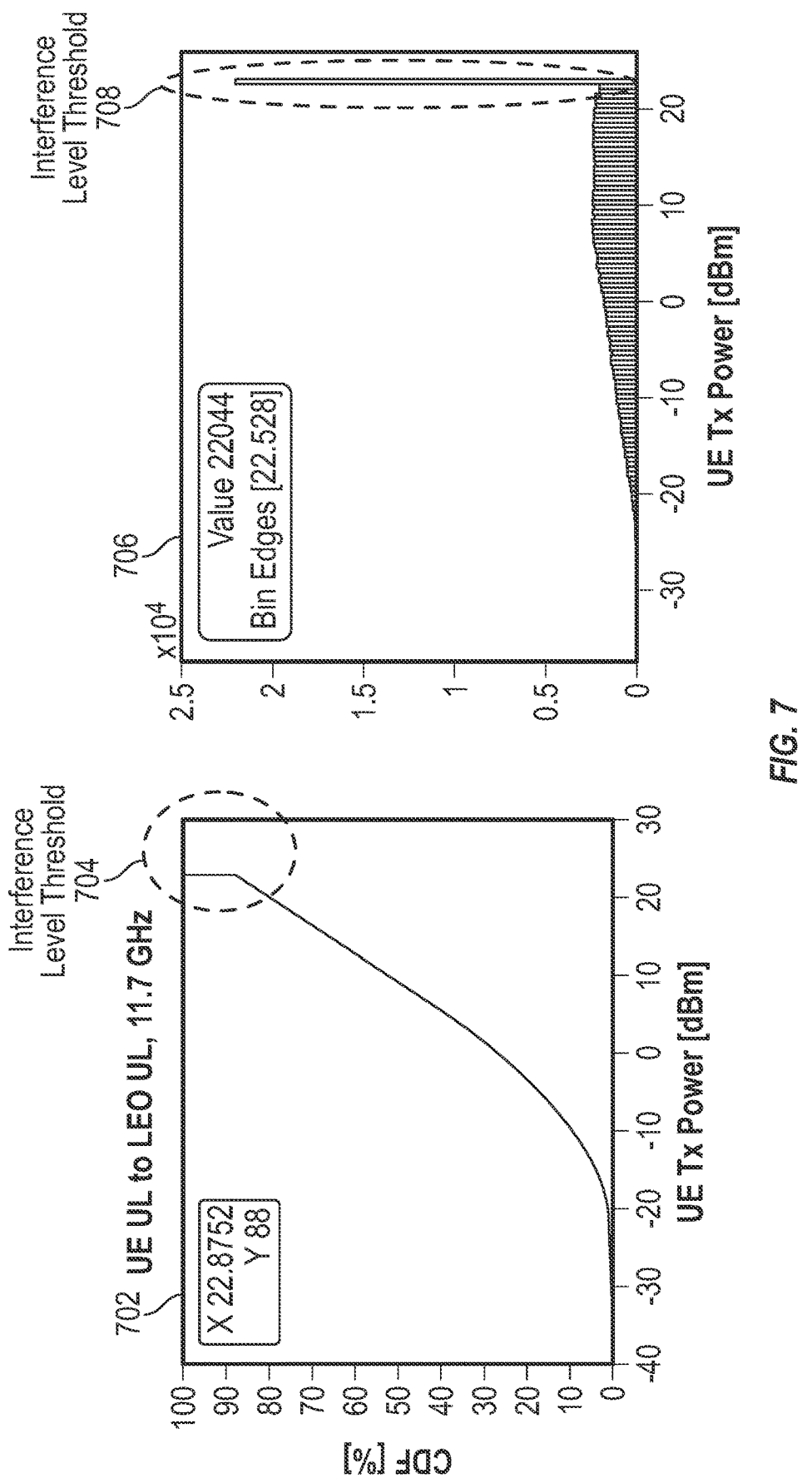
FIG. 7 depicts a graphical view of UE power levels and aggregated interference.

FIG. 7 depicts a graph 702 depicting an example cumulative distribution function (CDF) of power level of a UE transmission (UE Tx power) uplink to an example low Earth orbit (LEO) uplink receiver, operating on an 11.7 GHz frequency. The x-axis depicts the UE Tx power in decibels per milliwatt (dBm). In various deployments, the maximum Tx power for each UE is 23 dBm. However, as depicted in area 704 of graph 702, an interference level threshold can be exceeded if a UE transmits at a level less than 23 dBm.

Graph 706 depicts example cumulative UE transmit power level for a number (N) of UEs transmitting simultaneously. An interference level threshold can be defined for a cell for an aggregate UE transmit power level, as shown in area 708 of graph 706. In some embodiments, an interference threshold ($Interf_{thr}$) can be defined to represent an interference level that is not to be exceeded for an NTN network. In some cases, in an effort to ensure an aggregated interference (in dBm) lower than the given interference threshold $Interf_{thr}$, an upper bound ($N_{max}$) of the number of UEs simultaneously transmitting with a certain transmitting power may be determined. In some deployments, $Interf_{thr}$ is −90 dBm/100 MHz, and it is desired that the NTN network limit the number of UE with a Tx power greater than or equal to 22.5 dBm. Assuming a typical maximum transmit power of a UE $$(P_{max}^{UE})$$

of 23 dBM, a difference between a maximum UE transmit power and desired UE transmit power ($\Delta Tx_{thr}$) may be 0.5 dB.

Further, the interference evaluation of FIG. 7 shows that not all UEs in a cell may be causing the interference to the NTN receiver. Rather, a subset of the UEs in the cell that have a transmit power close to the maximum transmit power of 23 dBm are the main sources of the interference. Thus, when the Tx power of a UE is close to the maximum power of the UE, that UE may be one (of a group) that is likely causing interference in the network, and that UE may be identified as a candidate for mitigation measures proposed herein.

To achieve an acceptable level of aggregated interference level from the UEs, it is desired to reduce the maximum number of UEs that are simultaneously transmitted with the high Tx power (i.e., Tx power minus Pmax is lower than a threshold value). Thus, in aspects of the present disclosure, the number of UEs actively transmitting on a TN uplink channel, with $$|Tx \text{ power} - P_{max}^{UE}| \leq \Delta Tx_{thr},$$

may be lower than $N_m$a in an effort to ensure an aggregated uplink interference level lower than Interf$_{thr}$. While Interf$_{thr}$ is set as −90 dBm/100 MHz in the example depicted in FIG. 7, the variable Interf$_{thr}$ can be set to a different value in other deployments. Further, while $\Delta Tx_{thr}$ is 0.5 dB in the example depicted in FIG. 7, the variable can be set to a different value in other deployments.

From the network side, the NTN may not know the transmitting power of each UE individually, but the UEs do transmit a power headroom (PHR) report to the TN serving cell. Based on the PHR report, a network entity (e.g., a central controller) can determine how much power is being transmitted by a particular UE, and if it is within the acceptable margin from the maximum power for the UE. If not, then the UE is a candidate for the application of interference mitigation measures.

Aspects of the disclosure are related to techniques mitigating interference from certain UEs that are operating in a serving cell of an in band TN and NTN wireless communication network.

Figure 8:
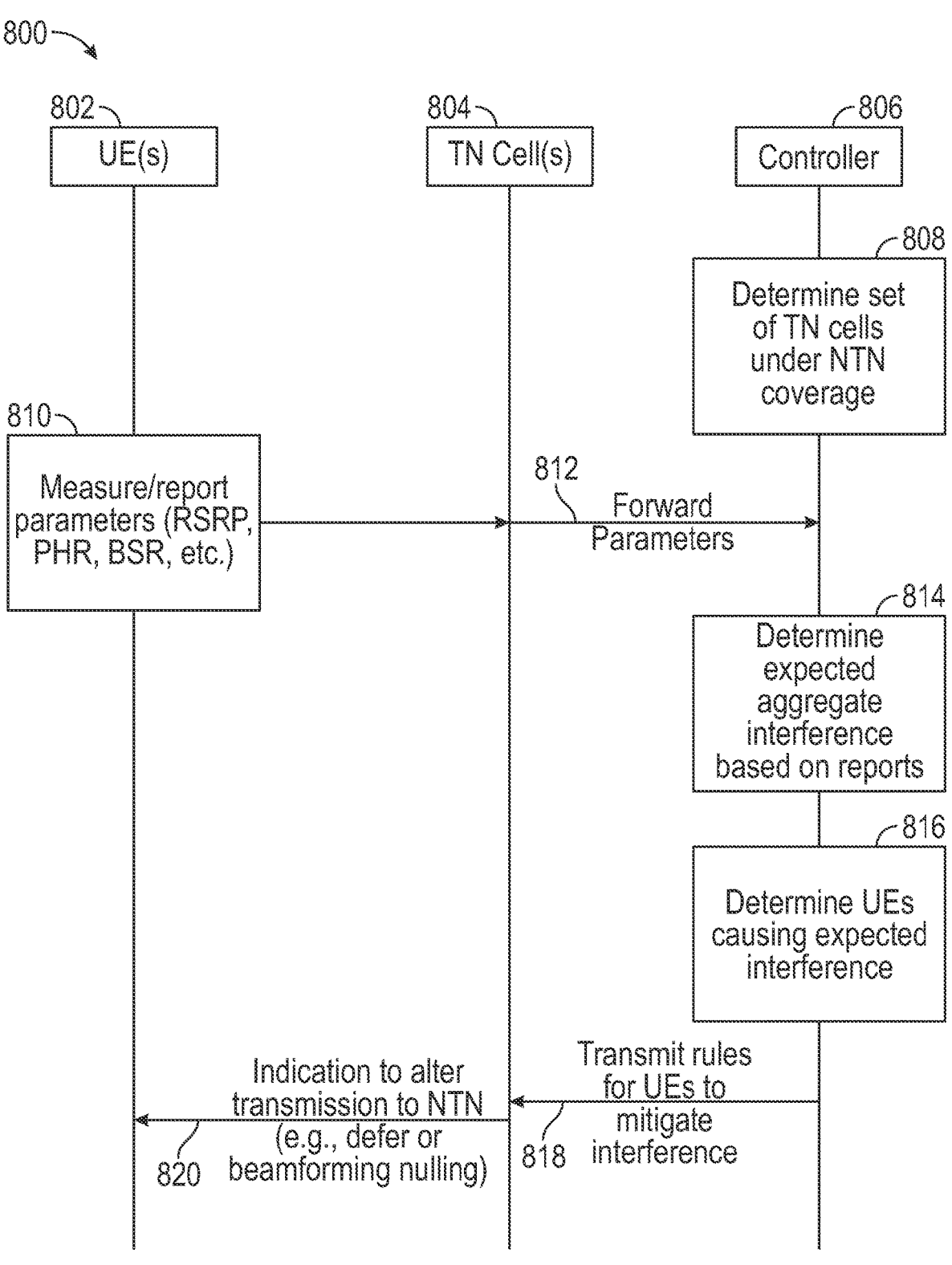
FIG. 8 depicts an example call flow diagram for interference mitigation, in accordance with aspects of the present disclosure.

The techniques proposed herein may be understood with reference to the call flow diagram 800 of FIG. 8, that depicts example operations for mitigation of interference caused to an NTN receiver (not shown) by uplink transmissions by one or more UEs 802 in one or more TN cell(s) 804. In some aspects, the UE(s) 802 of FIG. 8 are the same or similar to UE 104 of FIG. 1. Further, TN cell(s) 804 are the same or similar to TN cell 604 of FIG. 6. A central controller 806 may be used to allow the different TN cells in the NTN beam coverage to coordinate with one another, in order to mitigate the aggregated uplink TN interference towards the uplink NTN receiver. Controller 806 may be part of a particular TN cell, part of the NTN cell, or a separate entity.

In some cases, an evaluation of the aggregated interference from the different UEs across the TN cells may be performed. This evaluation may be needed because if there are only a few UEs operating at maximum Tx power, then the aggregated interference as a whole can still be lower than the threshold and the wireless communication system can work as intended. However, if there are a larger number of UEs with higher transmitting power, then the network controller can request that certain TN cells signal to some or all of the served UEs to reduce the transmission power.

As illustrated at 808, controller 806 may determine a set of TN cells that are under NTN coverage. That is, the controller determines a scope of NTN coverage, and which TN cell(s) overlap within the NTN coverage. In some aspects, the TN cell(s) that overlap with the NTN coverage operate at least partially on a same frequency band. In some aspects, the controller determines the set of TN cells that are under NTN coverage by computing the nadir point. In this context, the nadir point of a satellite may refer to an elevation angle of 90 degree. When the satellite position is at the zenith axis passing by a beam center, there will be a 90 degree between the satellite and horizontal. Because the controller knows the NTN entity position and the nadir point, it can detect the footprint of the NTN beam for every NTN cell. With this information, the controller may be able to detect the TN cells operating in the NTN cell in the same band, to provide mitigation strategies to reduce interference as discussed in detail below.

While not expressly depicted in call flow 800, the controller may also determines a time window for evaluating the interference level. In one example, the controller may determine a starting frame or slot and a length of the window, within which interference is to be evaluated. An NTN entity can be in constant motion, and thus interference can change significantly with time. Further, a TN cell is also dynamic and can server fewer or more UEs at any given time (with varying types of uplink traffic), thus causing the TN cell to have a varying contribution to an aggregated interference level.

As illustrated at 810, individual UEs may measure and report parameters to a (their respective) serving TN cell. As illustrated at 812, the TN cell(s) forward one or more of the received parameters to the controller 806. As illustrated at 814, the controller 806 subsequently determines an expected aggregated interference from the UEs based on the received reports.

The type and content of the reported parameters may vary. In some examples, a connected UE may report a power headroom (PHR) report to the serving TN cell for a particular configured time window. In other examples, a connected UE may determine and report an uplink buffer status report (BSR) to the serving TN cell for a particular configured time window. Based on a BSR, a TN cell or controller may determine whether a current uplink transmission level is likely to stay the same, increase, or be reduced, in a subsequent time window. That is, if the BSR indicates a large amount of uplink traffic, the UE will continue transmission in the next slot. However, if the BSR indicates a lower amount of uplink traffic, the UE may not continue transmitting in the next slot. Thus, by considering the BSR, the expected traffic of each UE can be predicted for the next slot, to determine if the uplink traffic will be the same or different for the NTN in the next slot.

In further examples, a connected UE may determine and report a downlink reference signal receive power (RSRP) of NTN non-serving cells, and use the downlink RSRP to approximate an uplink RSRP. Because the uplink transmitting power is known for each UE (through the PHR), a RSRP measurement can be used to approximate a total power level for a cell.

As illustrated at 816, controller 806 determines the set of UEs that are expected to cause an aggregated interference level to exceed the interference threshold limit. In some deployments, controller 806 determines the candidate UEs that are currently causing the aggregated interference level to exceed the limit. In other deployments, controller 806 determines the candidate UEs that are expected to cause the aggregated interference level to exceed the limit in a subsequent time window or slot.

As illustrated at 818, controller 806 may indicate one or more rules to the TN cells to identify UEs that are candidates to mitigate interference. In some aspects, based on the PHR distribution of different UEs, the controller 806 determines if one or more conditions are met. If so, the UEs that are candidates to mitigate uplink transmission to reduce aggregated interference are identified.

In some aspects, controller 806 determines the UEs that are candidates for interference mitigation, based on PHR reports. The UEs with lowest PHR are the dominant sources of the interference, because PHR indicates how much transmission power is left for a UE to use in addition to a current transmission power. This can be defined as a first condition for a UE to be identified as a candidate UE for mitigation measures: real power headroom measured quantity between $$0 \le |PH| = \left| Tx \, power - P_{max}^{UE} \right| \le +1,$$

which may be mapped to a power headroom value.

In addition, the UEs that are in a connected mode and have high uplink data in the buffer, based on uplink BSR reports, are likely to continue transmitting in a subsequent slot and continue causing interference. On the other hand, if a UE has a small BSR, it cannot be assumed that the UE will cause interference in the next slot. This can be defined as a second condition for a UE to be identified as a candidate UE for mitigation measures.

In some aspects, a UE that satisfies both a high PHR condition (condition 1) and a high BSR report (condition 2) may denoted by variable N, and determined to be a candidate for mitigation measures.

In some aspects, controller 806 measures uplink aggregated interference to an NTN receiver according to the following equation:

$$Aggregated \; interference \, (linear) = \sum_{k=1}^{N} 10^{\left(RSRP_k - TP_{max}^{SAT}\right) + P_{max}^{UE} + AG_{UE}},$$

where N represents the total number of UEs satisfying condition 1. In addition, the variable $$TP_{max}^{SAT}$$

is the maximum total power per beam for an NTN entity (satellite) without the satellite antenna gain. Thus, $$RSRP_k - TP_{max}^{SAT}$$

represents the path loss+satellite antenna gain. $RSRP_k$ is the RSRP measured of NTN non-serving cells. $AG_{UE}$ is the antenna gain of UE. If the UE is omni directional, a constant value is assumed by controller for antenna gain. However, if the UE has beamforming capability, the UE beam is estimated to be distributed uniformly in the satellite beam. Thus, $AG_{UE}$ is computed by controller 806 as a UE peak antenna Gain+Delta, where Delta may be based on a uniform variable between [X: 0]. The variable X can be selected by controller 806 to represent the directivity with respect to main lobe.

In this way, controller 806 monitors the uplink aggregated interference to the NTN (Satellite) receiver, and compares the aggregated interference to a threshold level (Interf$_{thr}$). The threshold level can be set by a TN cell in some aspects, or by an operator of the NTN network in other aspects.

Based on the evaluated interference, the controller 806 predicts the interference towards the NTN receiver in the upcoming slots or frames. This prediction is accurate since the controller considers the uplink BSR of the UEs. To mitigate the interference, the controller 806 indicates to DU (L2-PS) of each TN cell configuration, rules to control the maximum number of uplink TN UEs with active transmission (scheduled uplink UEs) and with power headroom real measurement close to zero $$\left(e.g. \left| Tx \, power - P_{max}^{UE} \right| \le \Delta Tx_{thr}\right).$$

If the N UEs are scheduled to transmit at the same time by different TN cells, an aggregate interference level at the NTN receiver will be high. However, if the N UEs are scheduled over time, or in different NTN cells, then the interference will be spread out and there will be no peak of interference at the NTN receiver.

As illustrated at 820, TN cells may indicate to their respective identified UEs to alter transmission to mitigate the interference to the NTN. In one aspect, the indication is to defer the uplink transmission by a UE. In the case of an uplink configured grant (CG), an uplink is repeated in every slot. Thus, a UE is defined to have an uplink transmission every period. If the UE is one of the N candidate UEs that is causing interference, then there will be more and more interference every period of time the UE is sending this uplink. In this scenario, controller 806 can request that the serving TN cell 804 defer the uplink transmission of UEs with $$\left| Tx \, power - P_{max}^{UE} \right| \le \Delta Tx_{thr}$$

i.e. power headroom level $j \in \{j_1, j_2, \ldots, j_n\}$(close to 23).

Various options may be applied for deferral. For example, a first option may be to define a deferral rule. A second option may be to use a semi-static configuration (e.g., RRC configure/reconfigure) of the deferral rule. The serving cell can signal UEs with a set (path loss+antenna gain) threshold, and a set of PHR levels $\{j_1, j_2, \ldots, j\_n\}$. The UE can defer the uplink transmission of the uplink CG if PHR level measured by UE belongs to this set $\{j_1 \, j_2, \ldots, j\_n\}$ and/or the estimated received signal from the UE at the satellite is higher than a configured threshold by TN network, e.g., $$DL \; RSRP \, (measured \; at \; UE) - TP_{max}^{SAT} \ge$$

RRC config/reconfig (pathloss+satellite antenna gain) threshold. In this way, the UE can defer its uplink transmission by a certain number of slots. In some examples, the UE defers transmission by 1-5 slots, to avoid a peak of interference.

In other aspects, a serving TN cell can dynamically indicate to capable UEs to apply beamforming nulling towards the NTN receiver. To accomplish this, the UE first needs to inform the TN cell about its beamforming nulling capability. The TN cell can then dynamically enable or disable beamforming nulling. When beamforming nulling is enabled at the UE, the TN cell can indicate to the UE, the elevation angle at which the UE should consider the NTN receiver. Because beamforming nulling can impact main beam lobes, it may be desired to only enable beamforming nulling at a UE towards the NTN receiver, when the uplink interference towards the NTN receiver is higher than the allowed threshold.

Further aspects for reducing interference relate to the controller 806 re-configuring the open loop power control (OLPC) parameters $$\left(P_0^{nominal}, \ \alpha\right)$$

for cells with scheduled UEs characterized by a small $$Tx \ power - P_{max}^{UE}$$

value, where α refers to a fractional power control parameter. Thus, the OLPC is optimized by adjusting the parameters, for different cells in the NTN coverage area, to meet the interference threshold level. With this method, the cell capacity of the TN cell as a whole may be impacted, since no distinction is made between UEs with higher transmit power and UEs with lower transmit power. In other words, OLPC parameters may be adjusted even for UEs that would not interfere with the NTN receiver. As such, this approach may be used as a self-organized network (SON) feature.

In other aspects, the TN network can apply priority-based dynamic scheduling by reserving some physical resource blocks (PRB) to the TN as a primary mobile network operator (MNO), and other PRBs to NTN operators. In some cases, an NTN network can request a TN network to use its reserved PRB. Thus, dynamic scheduling is achieved by providing priority to the TN network over the NTN network. When there is low load at both the TN and NTN networks, this approach can help reduce an aggregated interference level.

Figure 9:
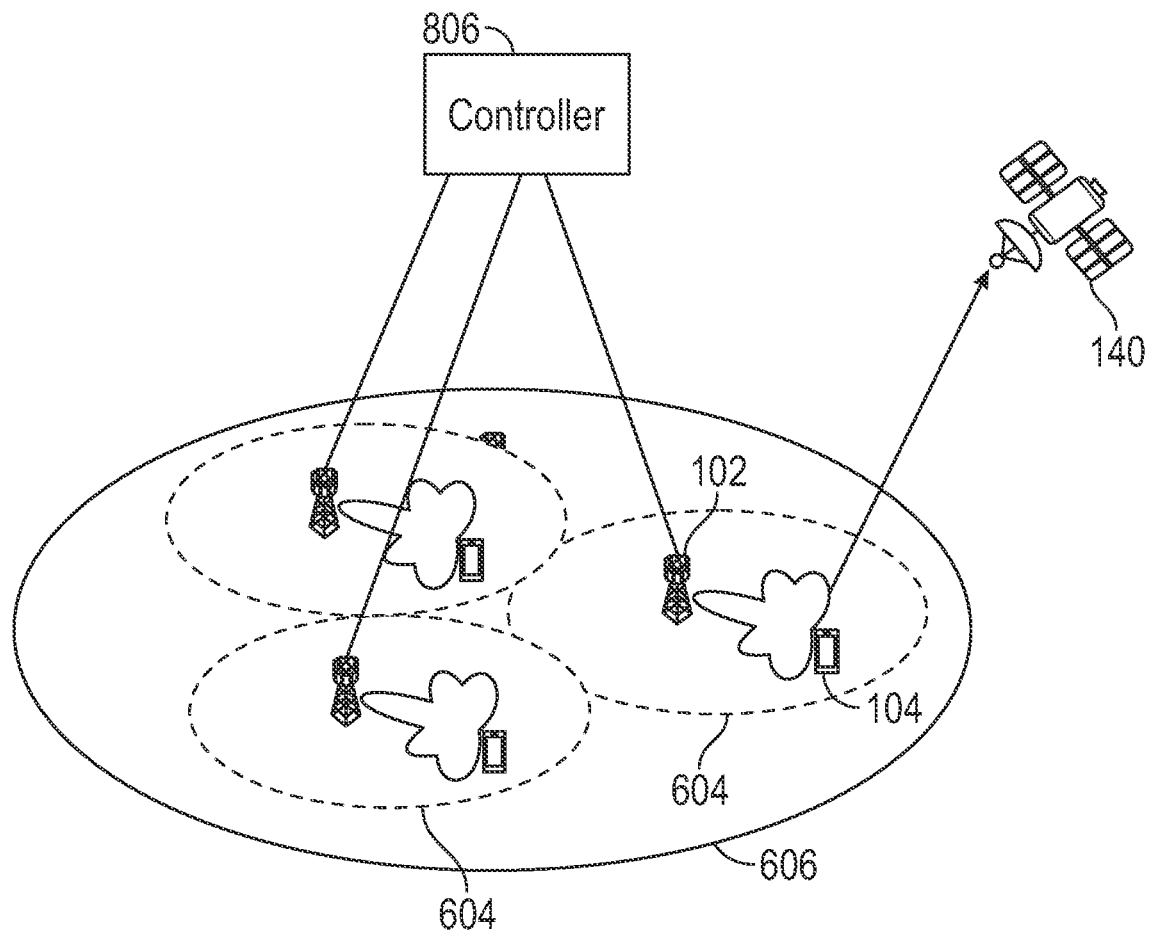
FIG. 9 depicts an example wireless communication network in which aspects of the present disclosure may be utilized.

Various signaling between controller 806 an TN cells for NTN interference mitigation proposed herein are illustrated in FIG. 9. In FIG. 9, a controller 806 is in communication with an NTN entity 140, as well as in communication with base stations 102 located in TN cells 604. Multiple TN cells 604 are located within NTN cell 606 that is served by NTN entity 140.

In another aspect of reducing interference, controller 806 can be a Near-RT RIC with artificial intelligence (AI) and/or machine learning (ML) capability, connected to DU and CU of a TN entity using O-RAN interfaces.

In a cloud deployment where DU and/or CU are hosted in the cloud, controller 806 can be a logical entity and the physical entity hosted in the cloud and acting as an interference management entity.

Figure 10:
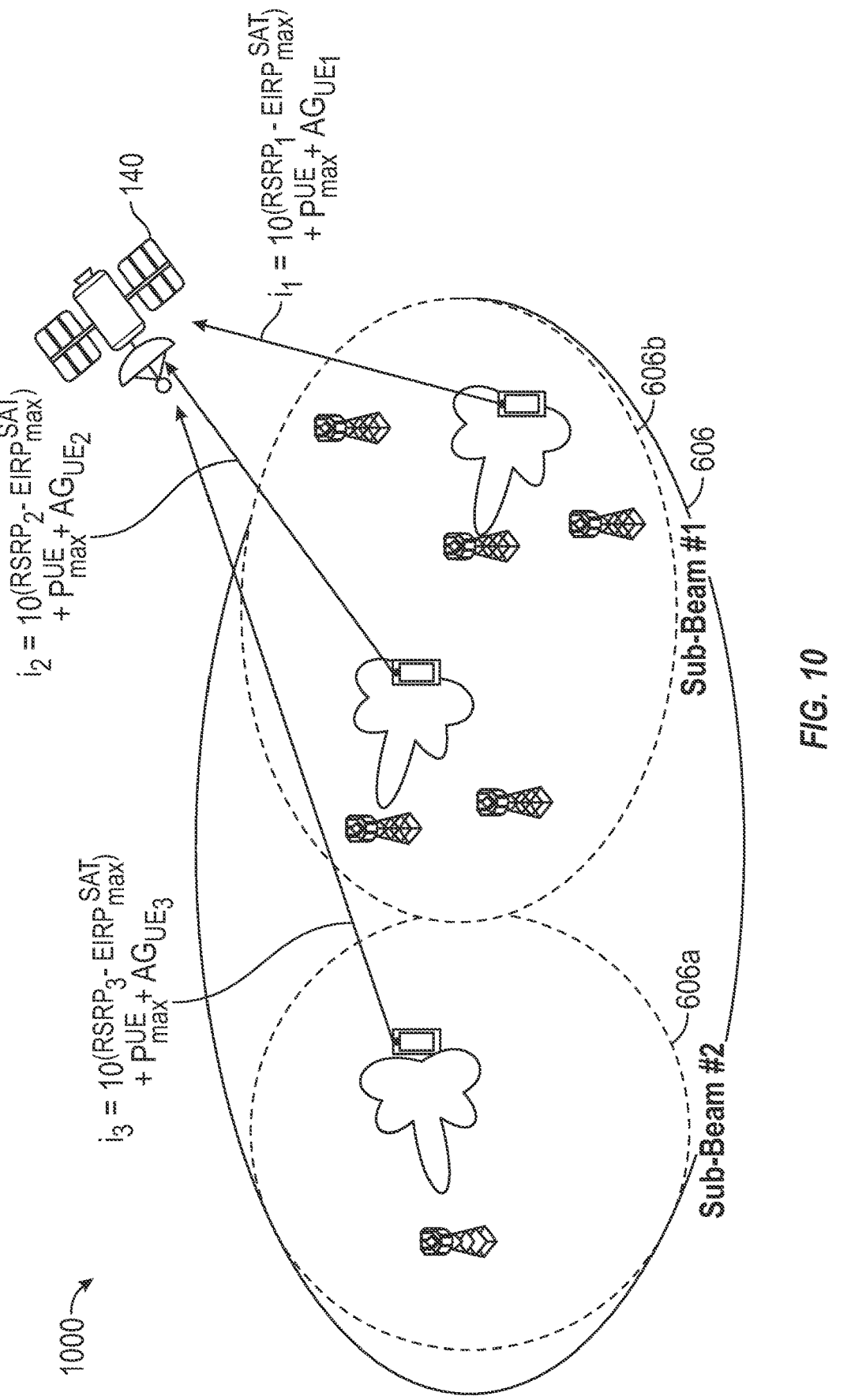
FIG. 10 depicts another example wireless communication network in which aspects of the present disclosure may be utilized.

FIG. 10 depicts a further deployment for a wireless communication network 900, for interference mitigation. In network 900, NTN entity 140 has beam footprint 606, which can be split into multiple sub-beams 606a and 606b. In some aspects, the sub-beams may serve a same number of TN cells. In other aspects, sub-beams may serve a different number of TN cells. A controller, such as controller 806 of FIG. 9, can compute a partial aggregated interference for each sub-beam. Based on a number of TN cells associated to each sub-beam, controller can determine an interference threshold level for each sub-beam. For example, if sub-beam 606a has 40 TN cells, while sub-beam 606b has 60 TN cells, controller may determine that an aggregate interference threshold level for sub-beam 606a is 40% of a total interference threshold level for the NTN entity 140, while sub-beam 606b has 60% of the total interference threshold.

Further, if each sub-beam is associated to a CU, then the partial inference management can be located at each CU. In this aspect, each CU can calculate its own aggregate interference from the UEs that are served by the CU.

Example Operations

FIG. 11 shows an example of a method 1100 of wireless communications at a network entity, such as a BS 102 of FIGS. 1 and 3, or a disaggregated base station as discussed with respect to FIG. 2.

Method 1100 begins at step 1105 with receiving information regarding one or more user equipments (UEs) served by one or more terrestrial network (TN) cells, wherein the one or more TN cells operate in a first frequency band that at least partially overlaps with a second frequency band of a non-terrestrial network (NTN). In some cases, the operations of this step refer to, or may be performed by, circuitry for receiving and/or code for receiving as described with reference to FIG. 13.

Method 1100 then proceeds to step 1110 with performing one or more actions, based on the information, to mitigate expected uplink (UL) interference to the NTN caused by the UEs. In some cases, the operations of this step refer to, or may be performed by, circuitry for performing and/or code for performing as described with reference to FIG. 13.

In some aspects, the method 1100 further includes processing the received information to identify at least some of the UEs that are expected to cause uplink interference to the NTN. In some cases, the operations of this step refer to, or may be performed by, circuitry for processing and/or code for processing as described with reference to FIG. 13.

In some aspects, the network entity comprises a TN network entity.

In some aspects, the one or more actions comprise: transmitting an indication to the at least some of the UEs to apply at least one predetermined rule designed to mitigate uplink interference to the NTN.

In some aspects, the one or more actions comprise: transmitting an indication to the at least some of the UEs to defer uplink transmission.

In some aspects, the one or more actions comprise: transmitting an indication to the at least some of the UEs to perform beamforming nulling in a particular direction.

In some aspects, the method 1100 further includes receiving an indication that the at least some of the UEs are capable of performing beamforming nulling, prior to transmitting the indication. In some cases, the operations of this step refer to, or may be performed by, circuitry for receiving and/or code for receiving as described with reference to FIG. 13.

In some aspects, the method 1100 further includes determining a time window for which expected interference is computed in order to identify the at least some of the UEs. In some cases, the operations of this step refer to, or may be performed by, circuitry for determining and/or code for determining as described with reference to FIG. 13.

In some aspects, the method 1100 further includes identifying the one or more TN cells, based on at least one of a beam footprint or a nadir point of the NTN, wherein receiving the information comprises receiving information regarding one or more UEs served by the identified TN cells. In some cases, the operations of this step refer to, or may be performed by, circuitry for identifying and/or code for identifying as described with reference to FIG. 13.

In some aspects, the receiving information regarding one or more UEs further comprises receiving information that an aggregate power level of the one or more UEs served by the NTN is greater than a predetermined threshold.

In some aspects, the receiving information that an aggregate power level of the one or more UEs served by the NTN is greater than a predetermined threshold is based at least in part on a power headroom report transmitted by the one or more UEs to a TN entity.

In some aspects, the receiving information that an aggregate power level of the one or more UEs served by the NTN is greater than a predetermined threshold is based at least in part on an uplink buffer status report (BSR) transmitted by the one or more UEs.

In some aspects, the receiving information that an aggregate power level of the one or more UEs served by the NTN is greater than a predetermined threshold is based at least in part on a downlink (DL) reference signal receive power (RSRP) measurement of the NTN.

In some aspects, the receiving information that an aggregate power level of the one or more UEs served by the NTN is greater than a predetermined threshold is based at least in part on a determination by the NTN that a transmitting power of the one or more UEs is greater than or equal to a predefined threshold.

In some aspects, the receiving information that an aggregate power level of the one or more UEs served by the NTN is greater than a predetermined threshold is based at least in part on a determination of an expected aggregated interference by the one or more UEs to the NTN.

Figure 13:
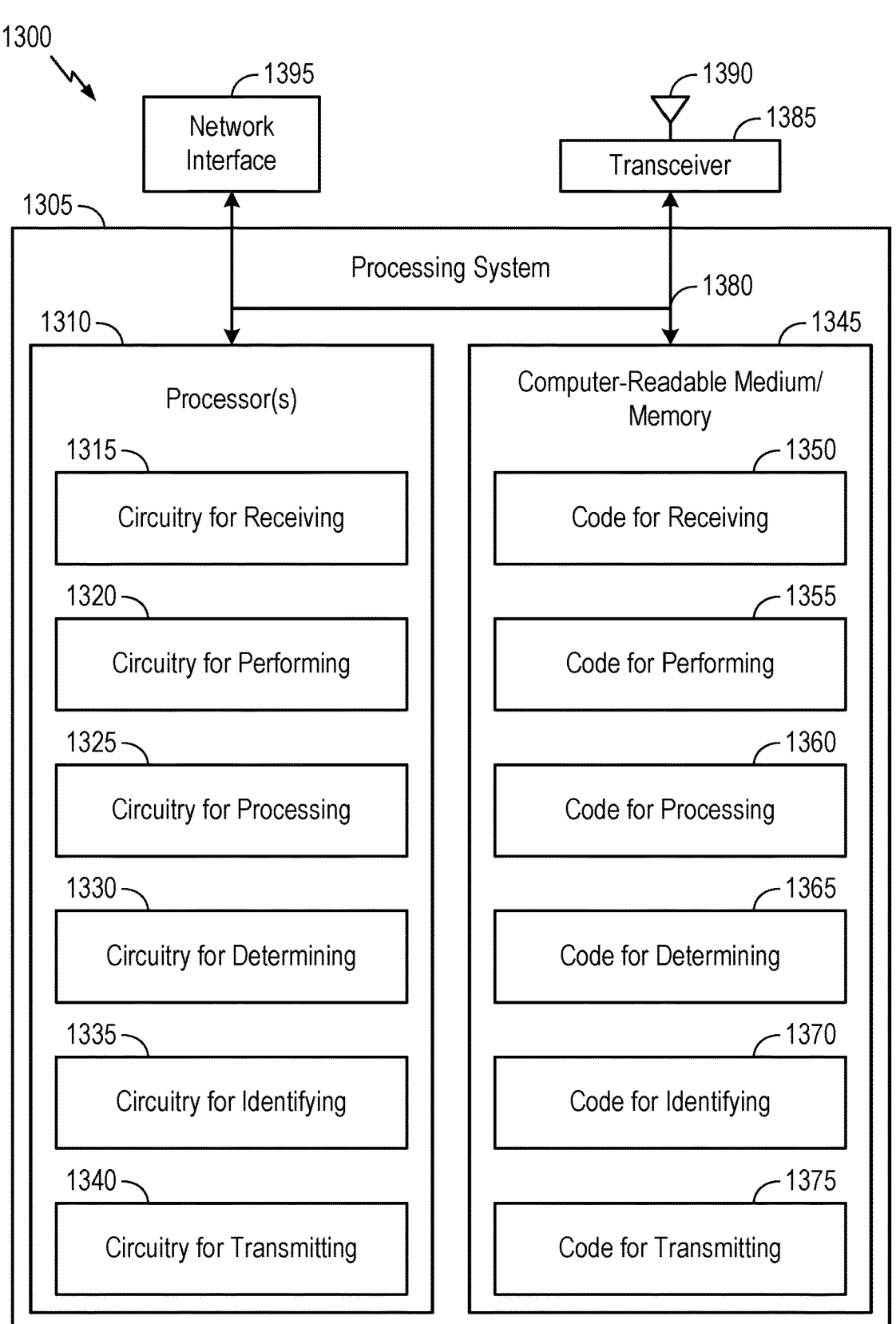
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100.

Communications device 1300 is described below in further detail.

Note that FIG. 11 is just one example of a method, and other methods including fewer, additional, or alternative steps are possible consistent with this disclosure.

Figure 12:
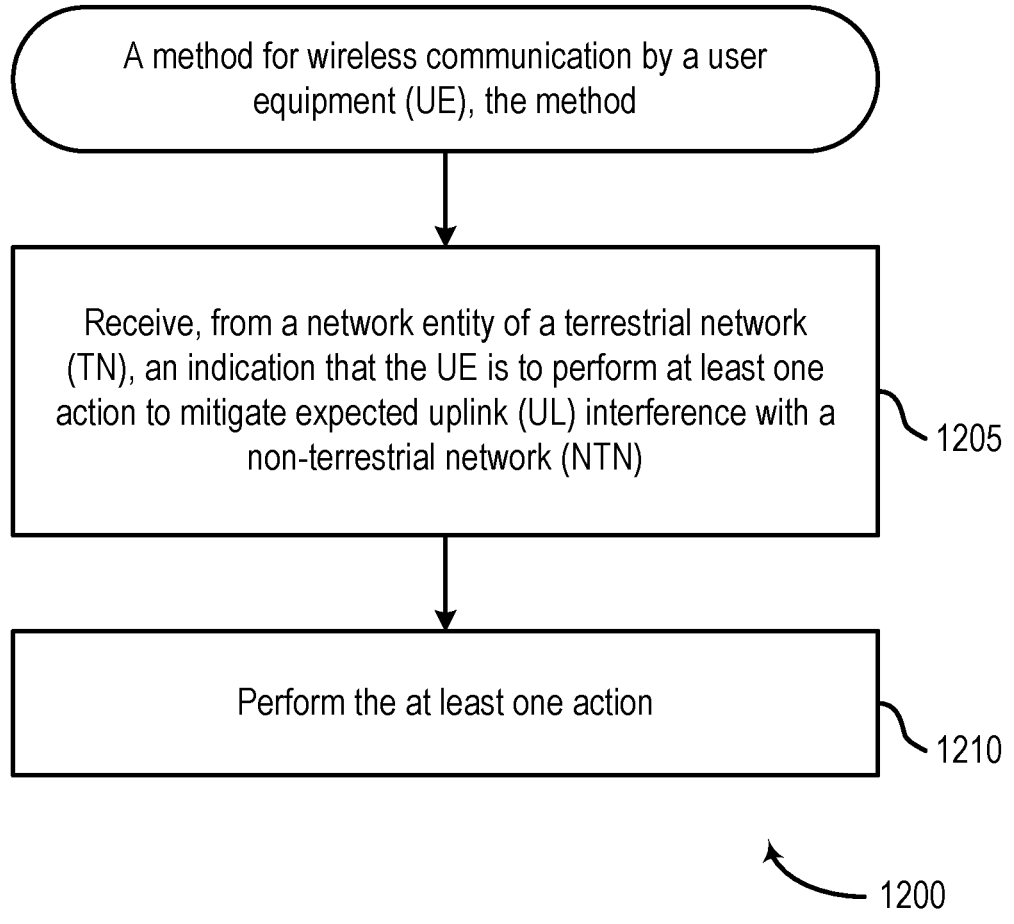
FIG. 12 depicts a method for wireless communications by a UE.

FIG. 12 shows an example of a method 1200 of wireless communication by a user equipment (UE), the method, such as a UE 104 of FIGS. 1 and 3.

Method 1200 begins at step 1205 with receiving, from a network entity of a terrestrial network (TN), an indication that the UE is to perform at least one action to mitigate expected uplink (UL) interference with a non-terrestrial network (NTN). In some cases, the operations of this step refer to, or may be performed by, circuitry for receiving and/or code for receiving as described with reference to FIG. 13.

Method 1200 then proceeds to step 1210 with performing the at least one action. In some cases, the operations of this step refer to, or may be performed by, circuitry for performing and/or code for performing as described with reference to FIG. 13.

In some aspects, the performing the action comprises: applying at least one predetermined rule to mitigate the expected uplink interference with the NTN.

In some aspects, the performing the action comprises: deferring uplink transmission to the NTN by a specified amount of time.

In some aspects, the performing the action comprises: performing beamforming nulling.

In some aspects, the method 1200 further includes transmitting an indication to the NTN that the UE is capable of performing beamforming nulling. In some cases, the operations of this step refer to, or may be performed by, circuitry for transmitting and/or code for transmitting as described with reference to FIG. 13.

In one aspect, method 1200, or any aspect related to it, may be performed by an apparatus, such as communications device 1300 of FIG. 13, which includes various components operable, configured, or adapted to perform the method 1200. Communications device 1300 is described below in further detail.

Note that FIG. 12 is just one example of a method, and other methods including fewer, additional, or alternative steps are possible consistent with this disclosure.

Example Communications Device(s)

FIG. 13 depicts aspects of an example communications device 1300. In some aspects, communications device 1300 is a user equipment, such as UE 104 described above with respect to FIGS. 1 and 3. In some aspects, communications device 1300 is a network entity, such as BS 102 of FIGS. 1 and 3, or a disaggregated base station as discussed with respect to FIG. 2.

The communications device 1300 includes a processing system 1305 coupled to the transceiver 1385 (e.g., a transmitter and/or a receiver). In some aspects (e.g., when communications device 1300 is a network entity), processing system 1305 may be coupled to a network interface 1395 that is configured to obtain and send signals for the communications device 1300 via communication link(s), such as a backhaul link, midhaul link, and/or fronthaul link as described herein, such as with respect to FIG. 2. The transceiver 1385 is configured to transmit and receive signals for the communications device 1300 via the antenna 1390, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1345 via a bus 1380. In certain aspects, the computer-readable medium/memory 1345 is configured to store instructions (e.g., computer-executable code) that when executed by the one or more processors 1310, cause the one or more processors 1310 to perform the method 1100 described with respect to FIG. 11, or any aspect related to it; and the method 1200 described with respect to FIG. 12, or any aspect related to it. Note that reference to a processor performing a function of communications device 1300 may include one or more processors 1310 performing that function of communications device 1300.

In the depicted example, computer-readable medium/memory 1345 stores code (e.g., executable instructions), such as code for receiving 1350, code for performing 1355, code for processing 1360, code for determining 1365, code for identifying 1370, and code for transmitting 1375. Processing of the code for receiving 1350, code for performing 1355, code for processing 1360, code for determining 1365, code for identifying 1370, and code for transmitting 1375 may cause the communications device 1300 to perform the method 1100 described with respect to FIG. 11, or any aspect related to it; and the method 1200 described with respect to FIG. 12, or any aspect related to it.

The one or more processors 1310 include circuitry configured to implement (e.g., execute) the code stored in the computer-readable medium/memory 1345, including circuitry for receiving 1315, circuitry for performing 1320, circuitry for processing 1325, circuitry for determining 1330, circuitry for identifying 1335, and circuitry for transmitting 1340. Processing with circuitry for receiving 1315, circuitry for performing 1320, circuitry for processing 1325, circuitry for determining 1330, circuitry for identifying 1335, and circuitry for transmitting 1340 may cause the communications device 1300 to perform the method 1100 described with respect to FIG. 11, or any aspect related to it; and the method 1200 described with respect to FIG. 12, or any aspect related to it.

Various components of the communications device 1300 may provide means for performing the method 1100 described with respect to FIG. 11, or any aspect related to it; and the method 1200 described with respect to FIG. 12, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1385 and the antenna 1390 of the communications device 1300 in FIG. 13. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1385 and the antenna 1390 of the communications device 1300 in FIG. 13.

Example Clauses

Implementation examples are described in the following numbered clauses:

Clause 1: A method for wireless communications at a network entity, comprising: receiving information regarding one or more user equipments (UEs) served by one or more terrestrial network (TN) cells, wherein the one or more TN cells operate in a first frequency band that at least partially overlaps with a second frequency band of a non-terrestrial network (NTN); and performing one or more actions, based on the information, to mitigate expected uplink (UL) interference to the NTN caused by the UEs.

Clause 2: The method of Clause 1, further comprising: processing the received information to identify at least some of the UEs that are expected to cause uplink interference to the NTN.

Clause 3: The method of Clause 2, wherein the network entity comprises a TN network entity.

Clause 4: The method of Clause 2, wherein the one or more actions comprise: transmitting an indication to the at least some of the UEs to apply at least one predetermined rule designed to mitigate uplink interference to the NTN.

Clause 5: The method of Clause 2 wherein the one or more actions comprise: transmitting an indication to the at least some of the UEs to defer uplink transmission.

Clause 6: The method of Clause 2, wherein the one or more actions comprise: transmitting an indication to the at least some of the UEs to perform beamforming nulling in a particular direction.

Clause 7: The method of Clause 6, further comprising receiving an indication that the at least some of the UEs are capable of performing beamforming nulling, prior to transmitting the indication.

Clause 8: The method of Clause 2, further comprising determining a time window for which expected interference is computed in order to identify the at least some of the UEs.

Clause 9: The method of any one of Clauses 1-8, further comprising: identifying the one or more TN cells, based on at least one of a beam footprint or a nadir point of the NTN, wherein receiving the information comprises receiving information regarding one or more UEs served by the identified TN cells.

Clause 10: The method of any one of Clauses 1-9, wherein the receiving information regarding one or more UEs further comprises receiving information that an aggregate power level of the one or more UEs served by the NTN is greater than a predetermined threshold.

Clause 11: The method of Clause 10, wherein the receiving information that an aggregate power level of the one or more UEs served by the NTN is greater than a predetermined threshold is based at least in part on a power headroom report transmitted by the one or more UEs to a TN entity.

Clause 12: The method of Clause 10, wherein the receiving information that an aggregate power level of the one or more UEs served by the NTN is greater than a predetermined threshold is based at least in part on an uplink buffer status report (BSR) transmitted by the one or more UEs.

Clause 13: The method of Clause 10, wherein the receiving information that an aggregate power level of the one or more UEs served by the NTN is greater than a predetermined threshold is based at least in part on a downlink (DL) reference signal receive power (RSRP) measurement of the NTN.

Clause 14: The method of Clause 10, wherein the receiving information that an aggregate power level of the one or more UEs served by the NTN is greater than a predetermined threshold is based at least in part on a determination by the NTN that a transmitting power of the one or more UEs is greater than or equal to a predefined threshold.

Clause 15: The method of Clause 10, wherein the receiving information that an aggregate power level of the one or more UEs served by the NTN is greater than a predetermined threshold is based at least in part on a determination of an expected aggregated interference by the one or more UEs to the NTN.

Clause 16: A method for wireless communication by a user equipment (UE), the method comprising: receiving, from a network entity of a terrestrial network (TN), an indication that the UE is to perform at least one action to mitigate expected uplink (UL) interference with a non-terrestrial network (NTN); and performing the at least one action.

Clause 17: The method of Clause 16, wherein the performing the action comprises: applying at least one predetermined rule to mitigate the expected uplink interference with the NTN.

Clause 18: The method of any one of Clauses 16-17, wherein the performing the action comprises: deferring uplink transmission to the NTN by a specified amount of time.

Clause 19: The method of any one of Clauses 16-18, wherein the performing the action comprises: performing beamforming nulling.

Clause 20: The method of Clause 19, further comprising: transmitting an indication to the NTN that the UE is capable of performing beamforming nulling.

Clause 21: An apparatus, comprising: a memory comprising executable instructions; and a processor configured to execute the executable instructions and cause the apparatus to perform a method in accordance with any one of Clauses 1-20.

Clause 22: An apparatus, comprising means for performing a method in accordance with any one of Clauses 1-20.

Clause 23: A non-transitory computer-readable medium comprising executable instructions that, when executed by a processor of an apparatus, cause the apparatus to perform a method in accordance with any one of Clauses 1-20.

Clause 24: A computer program product embodied on a computer-readable storage medium comprising code for performing a method in accordance with any one of Clauses 1-20.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a network entity, comprising: at least one memory comprising computer-executable instructions; and one or more processors configured to execute the computer-executable instructions and cause the apparatus to:
   receive information regarding one or more user equipments (UEs) served by one or more terrestrial network (TN) cells, wherein the one or more TN cells operate in a first frequency band that at least partially overlaps with a second frequency band of a non-terrestrial network (NTN);
   perform one or more actions, based on the information, to mitigate expected uplink (UL) interference to the NTN caused by the UEs, wherein the one or more actions comprise transmitting an indication to the at least some of the UEs to perform beamforming nulling in a particular direction;

process the received information to identify at least some of the UEs that are expected to cause uplink interference to the NTN; and receive an indication that the at least some of the UEs are capable of performing beamforming nulling, prior to transmitting the indication.

2. The apparatus of claim 1, wherein the network entity comprises a TN network entity.

3. The apparatus of claim 1, wherein the one or more actions comprise:

transmitting an indication to the at least some of the UEs to apply at least one predetermined rule designed to mitigate uplink interference to the NTN.

4. The apparatus of claim 1, wherein the one or more actions comprise:

transmitting an indication to the at least some of the UEs to defer uplink transmission.

5. The apparatus of claim 1, wherein the one or more processors are further configured to execute the computer-executable instructions and cause the apparatus to determine a time window for which expected interference is computed in order to identify the at least some of the UEs.

6. The apparatus of claim 1, wherein the one or more processors are further configured to execute the computer-executable instructions and cause the apparatus to:

identify the one or more TN cells, based on at least one of a beam footprint or a nadir point of the NTN, wherein receiving the information comprises receiving information regarding one or more UEs served by the identified TN cells.

7. An apparatus for wireless communication at a network entity, comprising: at least one memory comprising computer-executable instructions; and one or more processors configured to execute the computer-executable instructions and cause the apparatus to:

receive information regarding one or more user equipments (UEs) served by one or more terrestrial network (TN) cells, wherein the one or more TN cells operate in a first frequency band that at least partially overlaps with a second frequency band of a non-terrestrial network (NTN); and perform one or more actions, based on the information, to mitigate expected uplink (UL) interference to the NTN caused by the UEs;

wherein the receiving information regarding one or more UEs further comprises receiving information that an aggregate power level of the one or more UEs served by the NTN is greater than a predetermined threshold; and wherein the receiving information that an aggregate power level of the one or more UEs served by the NTN is greater than a predetermined threshold is based at least in part on:

a power headroom report transmitted by the one or more UEs to a TN entity, an uplink buffer status report (BSR) transmitted by the one or more UEs, a downlink (DL) reference signal receive power (RSRP) measurement of the NTN, a determination by the NTN that a transmitting power of the one or more UEs is greater than or equal to a predefined threshold, or a determination of an expected aggregated interference by the one or more UEs to the NTN.

8. An apparatus for wireless communication at a user equipment (UE), comprising: at least one memory comprising computer-executable instructions; and one or more processors configured to execute the computer-executable instructions and cause the apparatus to:

receive, from a network entity of a terrestrial network (TN), an indication that the UE is to perform at least one action to mitigate expected uplink (UL) interference with a non-terrestrial network (NTN);

transmit an indication to the NTN that the UE is capable of performing beamforming nulling; and perform the at least one action, wherein performing the at least one action comprises performing beamforming nulling.

9. The apparatus of claim 8, wherein the performing the action comprises:

applying at least one predetermined rule to mitigate the expected uplink interference with the NTN.

10. The apparatus of claim 8, wherein the performing the action comprises:

deferring uplink transmission to the NTN by a specified amount of time.

11. A method for wireless communications at a network entity, comprising:

receiving information regarding one or more user equipments (UEs) served by one or more terrestrial network (TN) cells, wherein the one or more TN cells operate in a first frequency band that at least partially overlaps with a second frequency band of a non-terrestrial network NTN); and performing one or more actions, based on the information, to mitigate expected uplink (UL) interference to the NTN caused by the UEs, wherein the one or more actions comprise transmitting an indication to the at least some of the UEs to perform beamforming nulling in a particular direction;

processing the received information to identify at least some of the UEs that are expected to cause uplink interference to the NTN;

receiving an indication that the at least some of the UEs are capable of performing beamforming nulling, prior to transmitting the indication.

12. The method of claim 11, wherein the network entity comprises a TN network entity.

13. The method of claim 11, wherein the one or more actions comprise:

transmitting an indication to the at least some of the UEs to apply at least one predetermined rule designed to mitigate uplink interference to the NTN.

14. The method of claim 11 wherein the one or more actions comprise:

transmitting an indication to the at least some of the UEs to defer uplink transmission.

15. The method of claim 11, further comprising determining a time window for which expected interference is computed in order to identify the at least some of the UEs.

16. The method of claim 11, further comprising:

identifying the one or more TN cells, based on at least one of a beam footprint or a nadir point of the NTN, wherein receiving the information comprises receiving information regarding one or more UEs served by the identified TN cells.

17. A method for wireless communication at a user equipment (UE), the method comprising:

receiving, from a network entity of a terrestrial network (TN), an indication that the UE is to perform at least one action to mitigate expected uplink (UL) interfer-
ence with a non-terrestrial network (NTN);

transmitting an indication to the NTN that the UE is
capable of performing beamforming nulling; and performing the at least one action, wherein performing the
at least one action comprises performing beamforming
nulling.

* * * * *